US011420775B2

(12) United States Patent
Fuller (10) Patent No.: US 11,420,775 B2
(45) Date of Patent: Aug. 23, 2022

(54) SYSTEMS AND METHODS FOR DEPLOYING A DEORBITING DEVICE

(71) Applicant: THE AEROSPACE CORPORATION, El Segundo, CA (US)

(72) Inventor: Jerome K. Fuller, Van Nuys, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 363 days.

(21) Appl. No.: 16/151,986

(22) Filed: Oct. 4, 2018

(65) Prior Publication Data

US 2020/0108953 A1    Apr. 9, 2020

(51) Int. Cl.
*B64G 1/62* (2006.01)
*B64G 1/22* (2006.01)
*B64G 1/10* (2006.01)
*B64G 1/44* (2006.01)

(52) U.S. Cl.
CPC .............. *B64G 1/62* (2013.01); *B64G 1/10* (2013.01); *B64G 1/222* (2013.01); *B64G 1/443* (2013.01)

(58) Field of Classification Search
CPC . B64G 1/10; B64G 1/222; B64G 1/44; B64G 1/443; B64G 1/62; B64G 1/648; B64G 2001/224; B64G 1/242; B64G 1/007
See application file for complete search history.

(56) References Cited

U.S. PATENT DOCUMENTS

| 3,286,951 | A | * | 11/1966 | Robertt | B64G 1/62 244/159.2 |
| 3,405,887 | A | * | 10/1968 | Mixson | B64C 39/06 244/158.9 |
| 3,416,750 | A | * | 12/1968 | Young | B64G 1/58 244/159.1 |
| 3,433,435 | A | * | 3/1969 | Alai | B64G 1/62 244/158.9 |
| 3,512,736 | A | * | 5/1970 | Anderson | B64G 1/62 244/159.1 |
| 3,566,131 | A | * | 2/1971 | Kelly | B64G 1/428 250/214 R |
| 3,816,804 | A | * | 6/1974 | Cardwell, Jr. | B64G 1/425 320/102 |
| 4,097,010 | A | * | 6/1978 | Colombo | B64G 1/648 244/158.2 |
| 4,504,031 | A | * | 3/1985 | Andrews | B64G 1/62 244/110 D |

(Continued)

*Primary Examiner* — Medhat Badawi
(74) *Attorney, Agent, or Firm* — One LLP (57) ABSTRACT

To reduce space debris and decrease risks for future space flights and currently operating satellites, NASA requires all satellites to have an end of life deorbiting plan to prevent satellites from having long and indefinite orbit lifespan. Accordingly, disclosed herein are systems and methods for deploying a deorbiting drag device to dramatically decrease the orbit lifespan of satellites. One of the methods comprises: providing power, using a photovoltaic panel, to a central processing unit (CPU) of the satellite; determining, using a health sensor, a health status of the satellite by monitoring activities of the CPU; and releasing a deorbiting drag device based on the health status by diverting power from the photovoltaic panel to a release actuator.

20 Claims, 8 Drawing Sheets

(56) References Cited

U.S. PATENT DOCUMENTS

| | | | | |
|---|---|---|---|---|
| 4,518,137 | A * | 5/1985 | Andrews | B64G 1/62 244/110 D |
| 4,832,288 | A * | 5/1989 | Kendall | B64G 1/62 244/113 |
| 4,834,325 | A * | 5/1989 | Faget | B64G 1/641 244/159.4 |
| 4,896,847 | A * | 1/1990 | Gertsch | B64G 1/62 244/159.1 |
| 5,108,046 | A * | 4/1992 | Chaumette | B64G 1/62 244/110 D |
| 5,108,047 | A * | 4/1992 | Puech | B64G 1/62 244/113 |
| 5,201,832 | A * | 4/1993 | Porter | B64G 1/401 244/110 D |
| 5,242,134 | A * | 9/1993 | Petro | B64G 1/62 244/158.1 |
| 5,328,132 | A * | 7/1994 | Shelby, Jr. | B64G 1/401 244/129.1 |
| 5,339,626 | A * | 8/1994 | Brusse | B64G 1/401 239/265.11 |
| 5,732,904 | A * | 3/1998 | Rieger | H01Q 15/14 244/1 R |
| 5,927,653 | A * | 7/1999 | Mueller | B64G 1/14 244/138 R |
| 6,042,051 | A * | 3/2000 | Hagerty | B64C 3/56 244/1 OOA |
| 6,116,543 | A * | 9/2000 | Koppel | B64G 1/002 244/158.5 |
| 6,199,800 | B1* | 3/2001 | Coe | B64D 17/66 244/142 |
| 6,264,144 | B1* | 7/2001 | Thornton | B64G 1/58 244/113 |
| 6,378,810 | B1* | 4/2002 | Pham | B64G 1/10 244/158.5 |
| 6,450,064 | B1* | 9/2002 | Christiansen | B64G 1/645 403/343 |
| 6,685,140 | B2* | 2/2004 | Carroll | B64C 39/028 244/139 |
| 6,755,377 | B1* | 6/2004 | Levin | B64G 1/32 244/158.2 |
| 6,830,222 | B1* | 12/2004 | Nock | B64G 1/242 244/110 D |
| 7,219,859 | B2* | 5/2007 | Johnson | B64G 1/646 244/159.1 |
| 7,250,568 | B1* | 7/2007 | Dow | F42B 10/50 114/20.1 |
| 7,262,394 | B2* | 8/2007 | August | F42B 10/62 244/3.3 |
| 7,464,900 | B2* | 12/2008 | Clark | B64G 1/56 114/361 |
| 7,669,802 | B2* | 3/2010 | Dorman | B64G 1/62 244/158.1 |
| 7,837,154 | B2* | 11/2010 | Trabandt | B64G 1/62 244/159.1 |
| 7,964,830 | B2* | 6/2011 | Olden | F42B 15/12 244/3.1 |
| 8,006,936 | B1* | 8/2011 | Farr, III | A63H 33/20 244/147 |
| 8,292,232 | B1* | 10/2012 | Andrews | B64G 1/62 244/159.1 |
| 8,399,816 | B2* | 3/2013 | Glasson | F41H 11/04 244/3.1 |
| 8,733,706 | B1* | 5/2014 | Fernandez | B64G 1/222 244/158.7 |
| 8,794,156 | B1* | 8/2014 | Smith | F42B 10/50 102/517 |
| 8,991,767 | B2* | 3/2015 | Featherstone | B64G 1/62 244/158.9 |
| 9,016,635 | B2* | 4/2015 | Hoyt | B64G 1/62 244/158.2 |
| 9,487,308 | B2* | 11/2016 | Featherstone | B64G 1/002 |
| 9,522,747 | B2* | 12/2016 | Coleman | B64D 19/00 |
| 9,555,904 | B2* | 1/2017 | Abrams | B64G 1/242 |
| 10,618,678 | B1* | 4/2020 | Tilley | B64G 1/406 |
| 2001/0011585 | A1* | 8/2001 | Cassidy | A61M 5/44 165/46 |
| 2005/0067533 | A1* | 3/2005 | Lukavec | B64D 17/56 244/149 |
| 2005/0266730 | A1* | 12/2005 | Lanni | G06F 1/26 439/131 |
| 2006/0052664 | A1* | 3/2006 | Julian | A61B 1/00128 600/146 |
| 2007/0029446 | A1* | 2/2007 | Mosher | B64G 1/10 244/158.1 |
| 2010/0215424 | A1* | 8/2010 | Crookston | F42B 10/14 403/6 |
| 2010/0310907 | A1* | 12/2010 | Miller | H01M 6/5055 429/90 |
| 2011/0210209 | A1* | 9/2011 | Taylor | H02S 30/20 244/172.6 |
| 2012/0105072 | A1* | 5/2012 | Peterson | G01R 31/42 324/511 |
| 2013/0032667 | A1* | 2/2013 | Hardy | B64G 1/62 244/113 |
| 2014/0048174 | A1* | 2/2014 | Lanigan | A61J 1/2096 141/349 |
| 2016/0194089 | A1* | 7/2016 | Zondervan | F02K 9/90 701/5 |
| 2016/0285273 | A1* | 9/2016 | Leinonen | H02J 4/00 |
| 2016/0332752 | A1* | 11/2016 | Abrams | B64G 1/222 |
| 2017/0230074 | A1* | 8/2017 | Rose | H04B 1/1036 |
| 2017/0293359 | A1* | 10/2017 | Ikuta | B60K 35/00 |
| 2019/0049999 | A1* | 2/2019 | Weiss | B64G 1/242 |
| 2019/0077523 | A1* | 3/2019 | Faber | B64G 1/222 |
| 2019/0329914 | A1* | 10/2019 | Dargin, III | B64G 1/242 |
| 2020/0095074 | A1* | 3/2020 | Byers | B66C 1/06 |
| 2020/0102100 | A1* | 4/2020 | Lozano | B64G 1/64 |
| 2020/0108923 | A1* | 4/2020 | Smith | G05D 1/0094 |
| 2020/0108924 | A1* | 4/2020 | Smith | F41H 13/0043 |
| 2020/0108953 | A1* | 4/2020 | Fuller | B64G 1/222 |

* cited by examiner

SYSTEMS AND METHODS FOR DEPLOYING A DEORBITING DEVICE

STATEMENT OF GOVERNMENT INTEREST

This invention was made with government support under contract No. FA8802-14-C-0001 awarded by the Department of the Air Force. The government has certain rights in the invention.

FIELD

Various aspects of the disclosure relate to systems and methods for deploying a deorbiting device.

BACKGROUND

Space debris is becoming an increasing safety risk for operating satellites, the International Space Station (ISS), and astronauts. Today, the number of space debris in the low Earth orbit (LEO) is estimated to be more than 720,000 pieces. Approximately 700,000 of these objects are between 1-10 cm in diameter. An estimated 20,000+ objects are larger than 10 cm in diameter. Many of these pieces of space debris are from abandoned satellites and debris from previous space missions (e.g., debris from rocket separation stages, spent orbital stages, collisions between large space debris, and jettisoned space wastes, etc.). A collision with a small piece of space debris traveling at a high orbital speed can be catastrophic. Unfortunately, collisions with space debris may be inevitable when the amount of space debris reaches sufficiently high number to cause the Kessler effect, which is a phenomenon where the density of space debris is high enough where collisions between objects can produce debris that will create cascading collisions with other objects and create more debris. The newly created debris in turn will cause even more cascading collisions and debris and so on. Once the Kessler effect becomes a reality, space flights will be extremely dangerous and the long-term viability of satellites in LEO will be extremely low. Accordingly, what is needed is a system and method for decreasing the orbit lifespan of satellites in order to reduce space debris.

SUMMARY

Disclosed is a system for deploying a deorbiting drag device on a satellite. The system comprises a drag device; a health sensor configured to monitor the health status of the satellite; a release actuator configured to retain the drag device in an undeployed position; and a photovoltaic panel coupled to a satellite-power inlet, the health sensor, and to the release actuator. Depending on the health status of the satellite, the health sensor can switch power generated by the photovoltaic panel from the satellite-power inlet or the main power circuitry to the release actuator. Once the release actuator is powered (i.e., draws a current from the photovoltaic panel), a deorbiting drag device can be released.

The health sensor can be a pulse sensor that receives intermittent signals from a central processing unit (CPU) of the satellite. The release actuator is programmed to release the deorbiting drag device when no intermittent signal is received by the pulse sensor for a predetermined amount of time. The health sensor can also be a current-sensing circuit coupled between the CPU of the satellite and the photovoltaic panel. The release actuator can be programmed to release the deorbiting drag device when a current draw is not detected for a predetermined amount of time.

In some embodiments, the photovoltaic panel is a main power source of the satellite. Alternatively, the satellite can include a main internal power source (e.g., battery) and the photovoltaic panel is a secondary power source of the satellite. The health sensor can be a current-sensing circuit configured to sense intermittent power draws from the main internal power source of the satellite or the photovoltaic panel. The release actuator can also be programmed to release the deorbiting drag device when intermittent power draws is not detected by the current-sensing circuit or the photovoltaic panel for a predetermined amount of time.

The health sensor can also be one or more voltage-sensing circuits configured to sense voltage across the main internal power source of the satellite and the photovoltaic panel. The release actuator can be programmed to release the deorbiting drag device when a voltage is not detected across the negative and positive nodes of each of the main internal power source and/or the photovoltaic panel. The system can also include a capacitor electrically coupled to the photovoltaic panel and the release actuator. In the event of a failure of the photovoltaic panel and/or the main internal power source, the capacitor can be designed to discharge and power the release actuator to release the deorbiting drag device, which can be a sail, an electrodynamic tether, a drag chute, or a balloon.

The release actuator can be a shape memory alloy wire designed to cause the deorbiting drag device to be released upon receiving a current from the photovoltaic panel. The release actuator can also be a burn wire that disintegrate upon receiving a current from the photovoltaic panel. Once the burn wire is disintegrated, the mechanism holding deorbiting drag device is disabled.

In some embodiments, a method for deploying a deorbiting drag device on a satellite is also disclosed. The method comprises: providing power, using a photovoltaic panel, to a central processing unit (CPU) of the satellite; determining, using a health sensor, a health status of the satellite by monitoring activities of the CPU; and releasing a deorbiting drag device based on the health status by diverting power from the photovoltaic panel to a release actuator.

Determining the health status can be achieved by monitoring, using a pulse sensor, intermittent signals from the CPU. Power can be diverted to the release actuator when no intermittent signal is detected for a predetermined amount of time. Determining the health status can also be achieved by monitoring, using a current-sensing circuit, power usage of the CPU. When no power usage is detected for a predetermined amount of time, power can be diverted to the release actuator by a switch. In some embodiments, both the power usage and the health signal (e.g., intermittent "I am alive" pulse") of the CPU are monitored to determine the health status of the CPU. In some embodiments, if the current draw of the CPU greatly exceeds the historical average current draw, a health status may be requested. If the CPU does not response, power can be diverted to the release actuator.

In one embodiment, the method further includes providing an internal power source to the CPU. In this embodiment, the photovoltaic panel is a secondary power source and the internal power source is a main power source. Determining the health status can be achieved by monitoring, using a current-sensing circuit, intermittent power usage of the internal power source. When no power usage is detected for a predetermined amount of time, power can be diverted to the release actuator in order to release the deorbiting drag device.

Determining the health status can also be achieved by monitoring, using a voltage-sensing circuit, voltages across the negative and positive nodes of each of the internal power source and the photovoltaic panel. When no voltage is detected from both the internal power source and the photovoltaic panel, power can be diverted to the release actuator.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

The technical standard entitled Process for Limiting Orbital Debris, from the National Aeronautics and Space Administration (NASA,) outlines the requirement for limiting the orbit lifetime of satellites to a maximum of 25 years. This requirement is for all satellites in all orbits such as a lower Earth orbit, a medium Earth orbit, a geosynchronous Earth orbit, or a geosynchronous transfer orbit. The purpose of the 25-year maximum orbital life requirement is to help reduce space debris and to limit the risk for future space flights and currently operating satellites.

Several methods have been proposed to remove space debris. Most of the proposed methods fall into two main categories, active and passive debris removal. Active space debris removal includes using a net, a robotic arm, or a built-in internal propulsion. The net method involves using a net to catch large and slow-moving debris. The robotic arm method has been proposed to capture failed or abandoned satellites in high orbits. The built-in internal propulsion method can be used to deorbit large satellite at high altitudes. At the end of the satellite's life, the internal propulsion system can fire and change the orbit to either descend rapidly into the Earth's atmosphere or into deep space. All three of these methods are expensive and impractical for removing small fast-moving space debris and small satellites such as a CubeSat.

Figure 1:
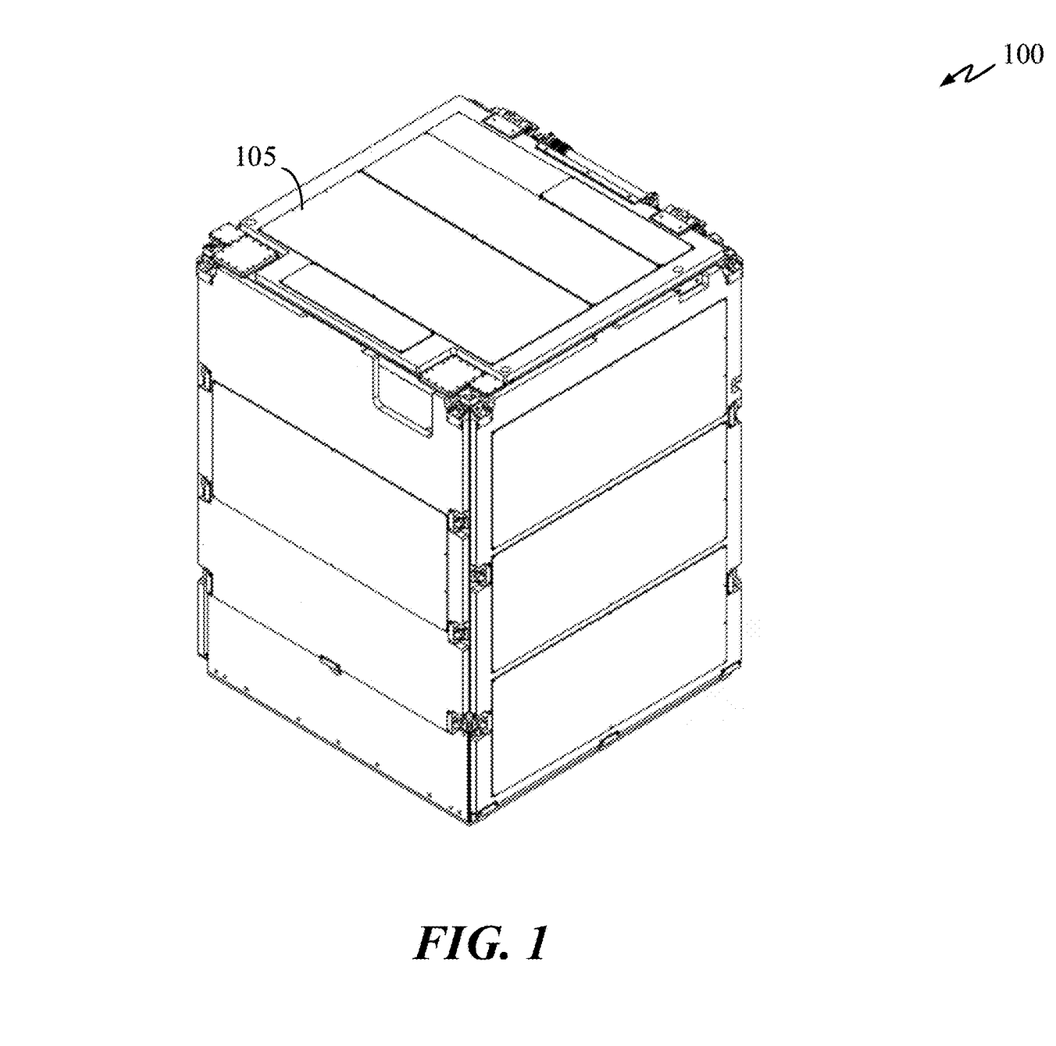
FIG. 1 illustrates an example of a CubeSat.

There are four common CubeSat designations or sizes: 1 U, 1.5 U, 2 U, and 3 U. A 1 U CubeSat has a dimension of 10 cm×10 cm×10 cm. A 2 U CubeSat has a dimension of 10 cm×10 cm×20 cm, and a 3 U CubeSat has a dimension of 10 cm×10 cm×30 cm. FIG. 1 illustrates an example of a 1.5 U CubeSat 100 with a dimension of 10 cm×10 cm×15 cm. CubeSats are small satellites that are frequently used on scientific/research missions. Without a proper deorbiting system, CubeSats can become potentially dangerous space debris. Because CubeSats are small, passive space debris removal methods are better suited for deployment on CubeSats. Passive space debris removal includes using a deorbiting drag device such as a sail, a chute, a balloon, an electrodynamic tether, an electrospray device, turkey feathers, cross-curve booms, retroreflectors, or the like to increase the atmospheric drag of the CubeSat in order to decrease the orbit lifespan.

A deorbiting drag device (not shown) can be located behind an end panel 105 of CubeSat 100. Once end panel 105 is opened, the deorbiting drag device can be deployed to increase the drag of CubeSat 100. The increased drag will cause CubeSat 100 to slow down and to eventually enter a new and shorter lifespan orbit toward the Earth's atmosphere where CubeSat 100 will disintegrate upon re-entry.

Figure 2:
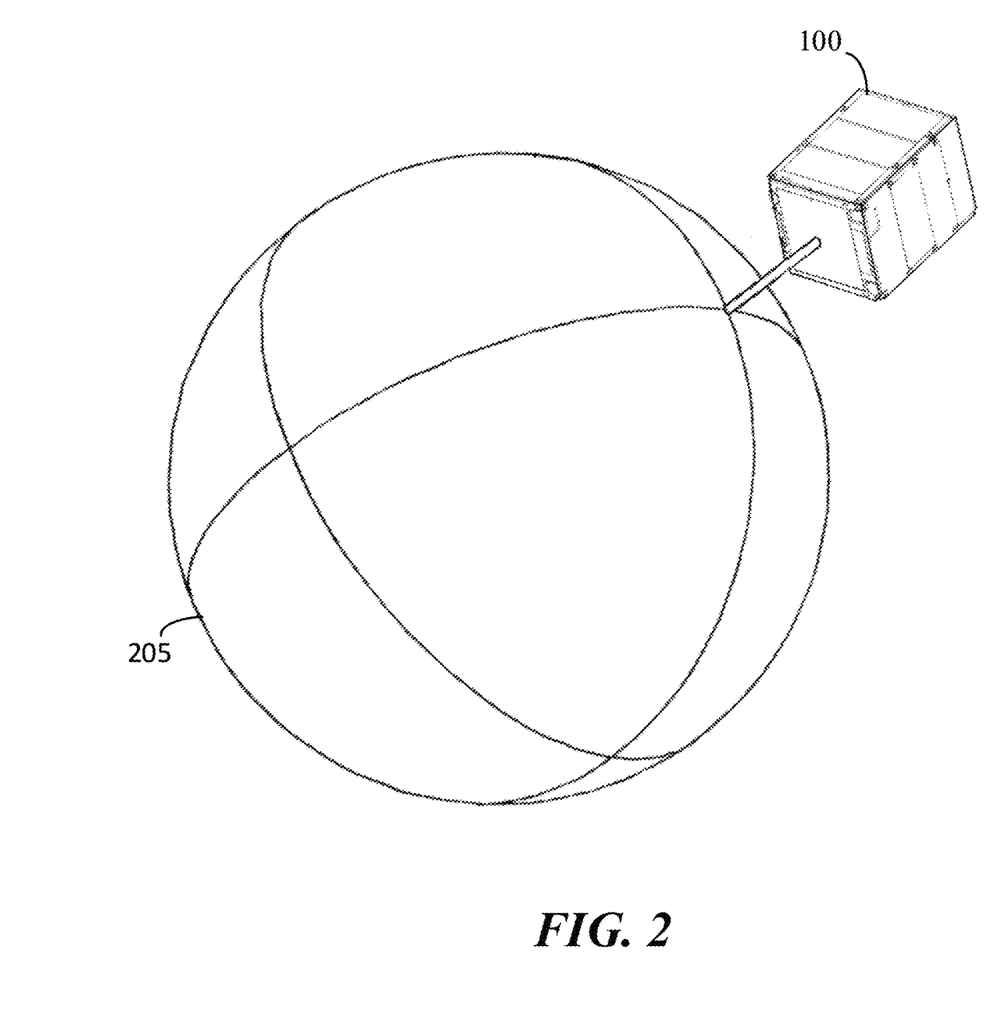
FIG. 2 illustrates an example of a CubeSat with a deployed drag balloon.

FIG. 2 illustrates CubeSat 100 with a deorbiting drag balloon 205 that can be employed to decrease the lifespan of the orbit of CubeSat 100 for altitudes between 700-900 kilometers (km). For satellites having orbits above 900 km, propulsion deorbiting and/or propulsion assisted deorbiting (used in combination with a drag device) is likely required to shorten the orbit lifespan of the satellite to below 25 years.

Preferably, drag balloon 205 can have a very large cross section as compared to the size of the satellite on which it is deployed. Having a large cross section allows drag balloon 205 to have a large drag area and thus greatly increases the total atmospheric drag of CubeSat 100.

Figure 3:
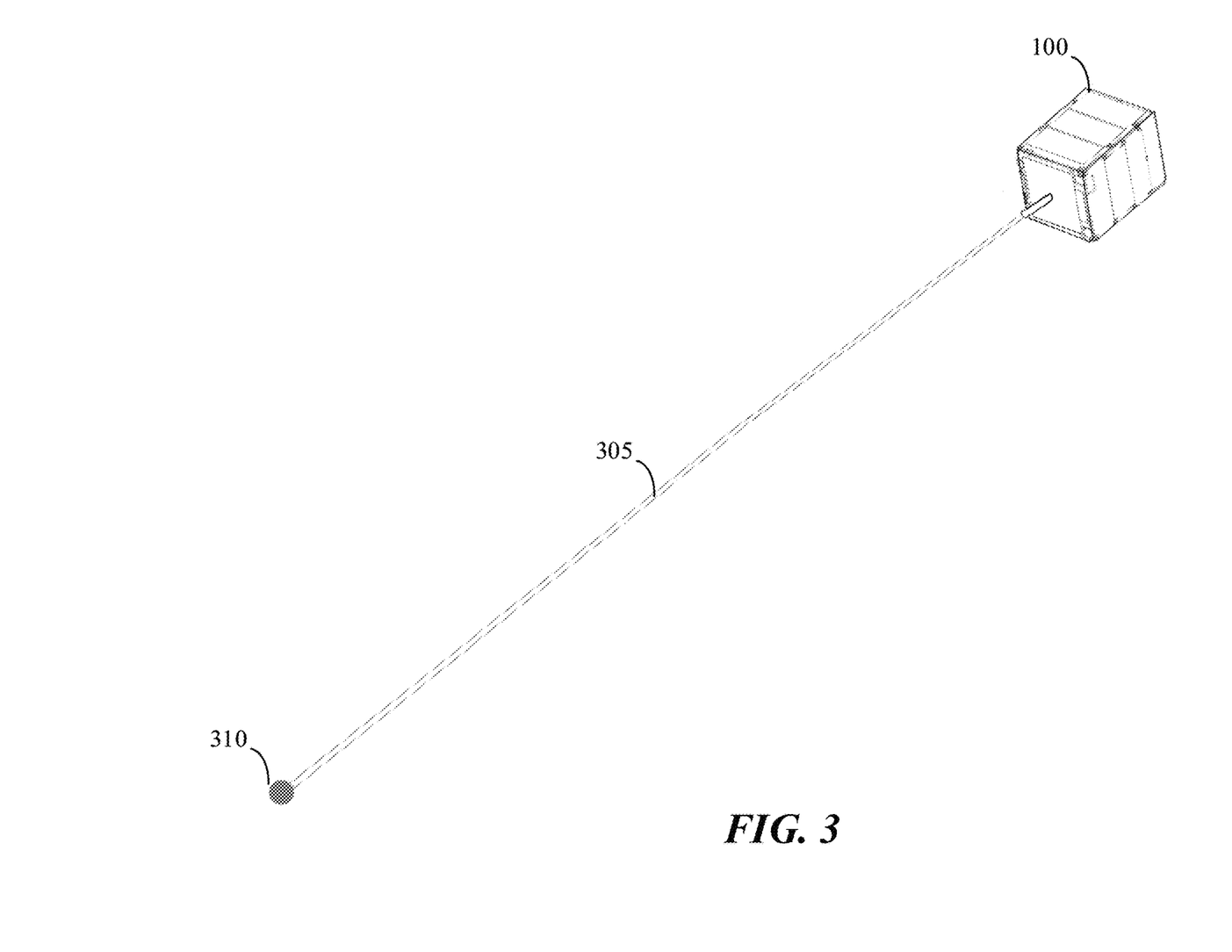
FIG. 3 illustrates an example of a CubeSat with a deployed electrodynamic tether.

FIG. 3 illustrates CubeSat 100 with an electrodynamic tether 305, which operates on a different principle than drag balloon 205. Electrodynamic tether 305 creates electrodynamic drag by reacting with the Earth's magnetic field. Electrodynamic tether 305 inducts the Earth's magnetic field to generate a current as it moves through the magnetic field. The generated current runs between an end reel 310 to the beginning of electrodynamic tether 305 at CubeSat 100 and thereby creates electrodynamic drag to slow down CubeSat 100. Generally, at high attitudes, the force of the electrodynamic drag can be much greater than the force of atmospheric drag due to the lack of atmospheric molecules.

Drag balloon 205 and electrodynamic tether 305 are examples of deorbiting drag devices that can be implemented by the systems and methods for deploying a deorbiting drag device as described herein. Additionally, it should be noted that CubeSat 100 can also be retrofitted with other types of passive drag device such as a sail, a chute, an electrospray device, turkey feathers, cross-curve booms, retroreflectors, or the like to increase the atmospheric drag of the CubeSat in order to decrease the orbit lifespan.

System for Deploying a Deorbiting Drag Device

Figure 4:
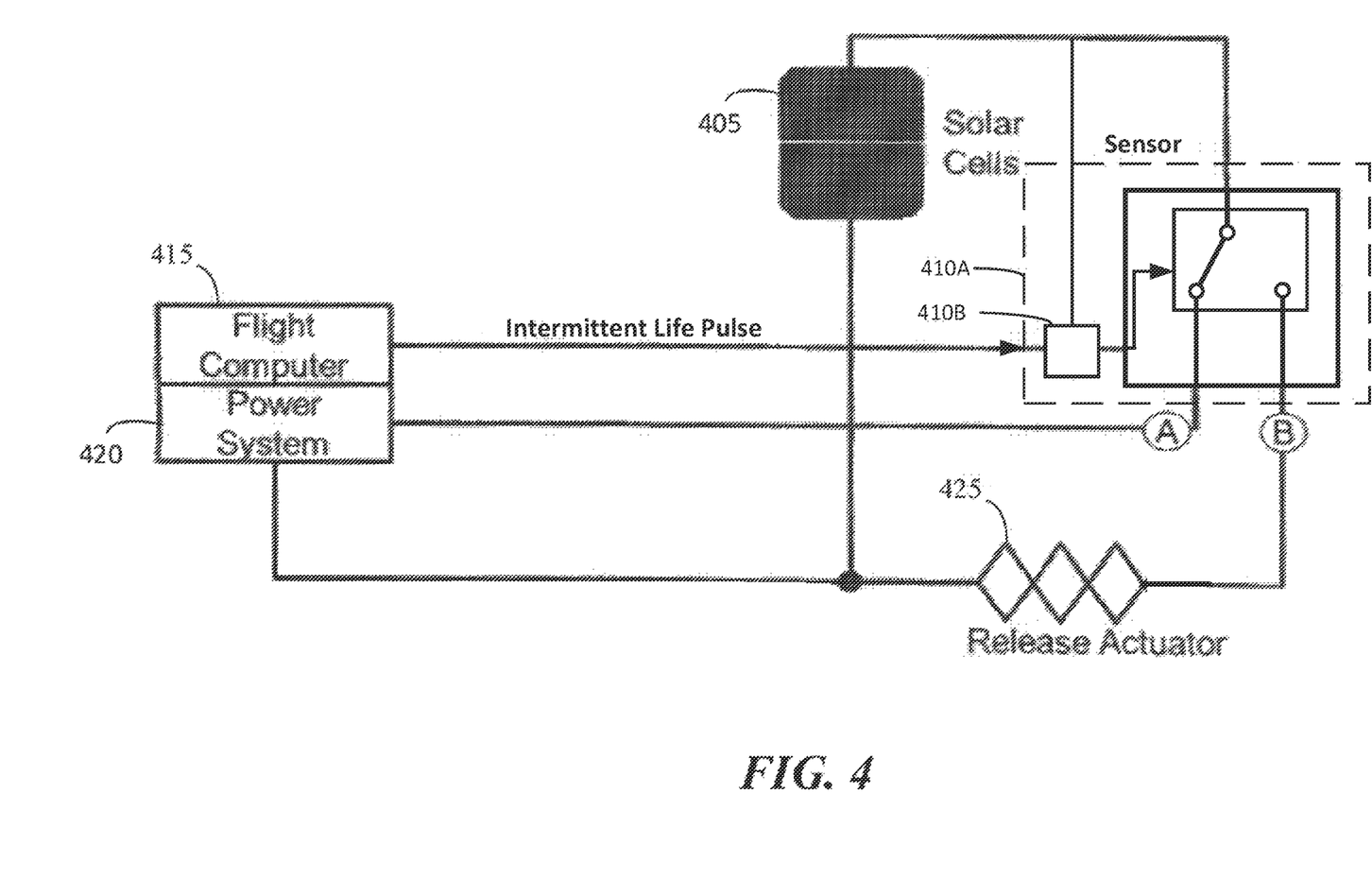
FIGS. 4-6 are circuit diagrams of systems for deploying a deorbiting drag device in accordance with some aspects of the disclosure.

FIG. 4 is a circuit diagram of system 400 for deploying a deorbiting drag device in accordance with some embodiments of the present disclosure. System 400 includes a photovoltaic panel 405, a health sensor 410, a flight computer 415 (or central processing unit (CPU)), a power system 420, a release actuator 425, and a deorbiting drag device (not shown) such as a sail, a balloon, a chute, or an electrodynamic tether.

Photovoltaic panel 405 can be electrically coupled to both health sensor 410 and to flight computer 415 or power system 420. In this way, photovoltaic panel 405 can be used to power health sensor 410 and flight computer 415. In some embodiments, photovoltaic panel 405 can be used to charge power system 420 that can include one or more batteries. Photovoltaic panel 405 can also be actuated to divert power to release actuator 425. In some embodiments, health sensor 410A can include a switch to switch power delivered to flight computer 415 (or power system 420) to release actuator 425 when health sensor 410 detects a failure of flight computer 415. The switch can be an integrated part of health sensor 410A. Alternatively, the switch can be independent of health sensor 410B.

Photovoltaic panel 405 can be an array photovoltaic cells arranged on the outer surfaces of CubeSat 100. Photovoltaic panel 405 can be used as a main power source for flight computer 415. Photovoltaic panel 405 can be coupled to a power inlet of flight computer 415 (CPU). The power inlet can be a power node that can receive power from one or more sources such as photovoltaic panel 405 or power system 420. Photovoltaic panel 405 can also be used as a secondary power source with its primary function being to charge the batteries of power system 420. In some embodiments, photovoltaic panel 405 can be coupled to power system 420 to charge the batteries of power system 420. In the event of a failure of power system 420, photovoltaic panel 405 can be switched to provide power to flight computer 415. In this embodiment, a voltage-sensing or a current-sensing circuit can be coupled to the batteries of power system 420 to monitor the health status of the batteries. Once a failure is detected (e.g., no voltage or no current draw), the voltage or current sensing circuit can divert power from photovoltaic panel 405 directly to flight computer 415. In some embodiments, the voltage or current sensing circuit can be an integrated component of health sensor 410. Alternatively, the voltage or current sensing circuit can be a separate component and/or integrated with power system 420.

Health sensor 410 can be a pulse sensor, a voltage sensor, a current sensor, or a combination thereof. As a pulse sensor, health sensor 410 can listen for intermittent life pulses transmitted by flight computer 415. In this way, health sensor 410 can determine whether flight computer 415 is operating normally. If intermittent life pulses are not received for a predetermined amount of time (e.g., several days or weeks), health sensor 410 can divert power from photovoltaic panel 405 to release actuator 425 to start the release process of the deorbiting drag device (see FIGS. 2 and 3). In some embodiments, health sensor 410 can ping flight computer 415 for a health status before diverting power to release actuator 425.

The pulse sensor can be an electrical signal sensor, an optical sensor, or a combination thereof. In one embodiment, flight computer 415 can transmit a life pulse or response to a ping using an optical signal. This can be done, for example, using a light emitting diode (LED). In this embodiment, the pulse sensor can be an analog light sensor such as a photo-resistor or a photocell. In some embodiments, flight computer 415 can transmit an electrical signal as a life pulse.

In some embodiments, health sensor 410 can also intermittently ping flight computer 415 to determine whether it is still operational. If a response is not received after a predetermined number of attempts or time, then health sensor 410 can start the release process of the deorbiting drag device.

Health sensor 410 can also include an integrated voltage sensor (not shown) to monitor the health status of the batteries of power system 420. The integrated voltage sensor can monitor the voltage across the positive and negative nodes of the batteries of power system 420. The integrated voltage sensor can also monitor the health status of photovoltaic panel 405. Health sensor 410 can use the integrated voltage sensor to monitor for any irregular voltage spikes, drops, or absent thereof in power system 420 and/or photovoltaic panel 405. The integrated voltage sensor can be a Hall effect voltage sensor, a resistor-based voltage sensor, or DC voltage transducers.

Health sensor 410 can also include a current sensor to monitor the power draw by flight computer 415 from the batteries of power system 420 and/or from photovoltaic panel 405. The current sensor can be a Hall effect current sensor, a fluxgate transformer current sensor, a resistor-based current sensor, or other suitable current sensing technologies. If no power draw is detected by flight computer 415 for a predetermined amount of time, then the release process of the deorbiting drag device can be started by diverting power to release actuator 425.

Health sensor 410 can be electrically coupled to one or more of flight computer 415, power system 420, photovoltaic panel 405, and release actuator 425. In some embodiments, health sensor 410 can include a switch to regulate current flow between photovoltaic panel 405 to flight computer 415 or release actuator 425. Health sensor 410 can also be electrically coupled to power system 420. In this way, the operating status of power system 420 can also be monitored by health sensor 410.

Release actuator 425 can be a burn wire, a wire cutter, or a shape memory alloy (SMA) wire. In some embodiments, release actuator 425 can be a burn wire designed to disintegrate (burn) upon receiving a current from photovoltaic panel 405 or from another power source such as power system 420 or a backup power capacitor (not shown). In some embodiments, release actuator 425 can be a wire cutter designed to cut a wire that holds the deorbiting drag device in an undeployed position. Once the wire is severed, the deorbiting drag device is deployed.

In some embodiments, release actuator 425 can be a SMA wire that changes shape upon receiving a current from photovoltaic panel 405 or from another power source. Once a current is directed to the SMA wire, it can retract and can activate a mechanical switch (lever) to release the deorbiting drag device. In some embodiments, the SMA wire can be a nitinol memory wire or other type of memory alloy wire.

Figure 5:
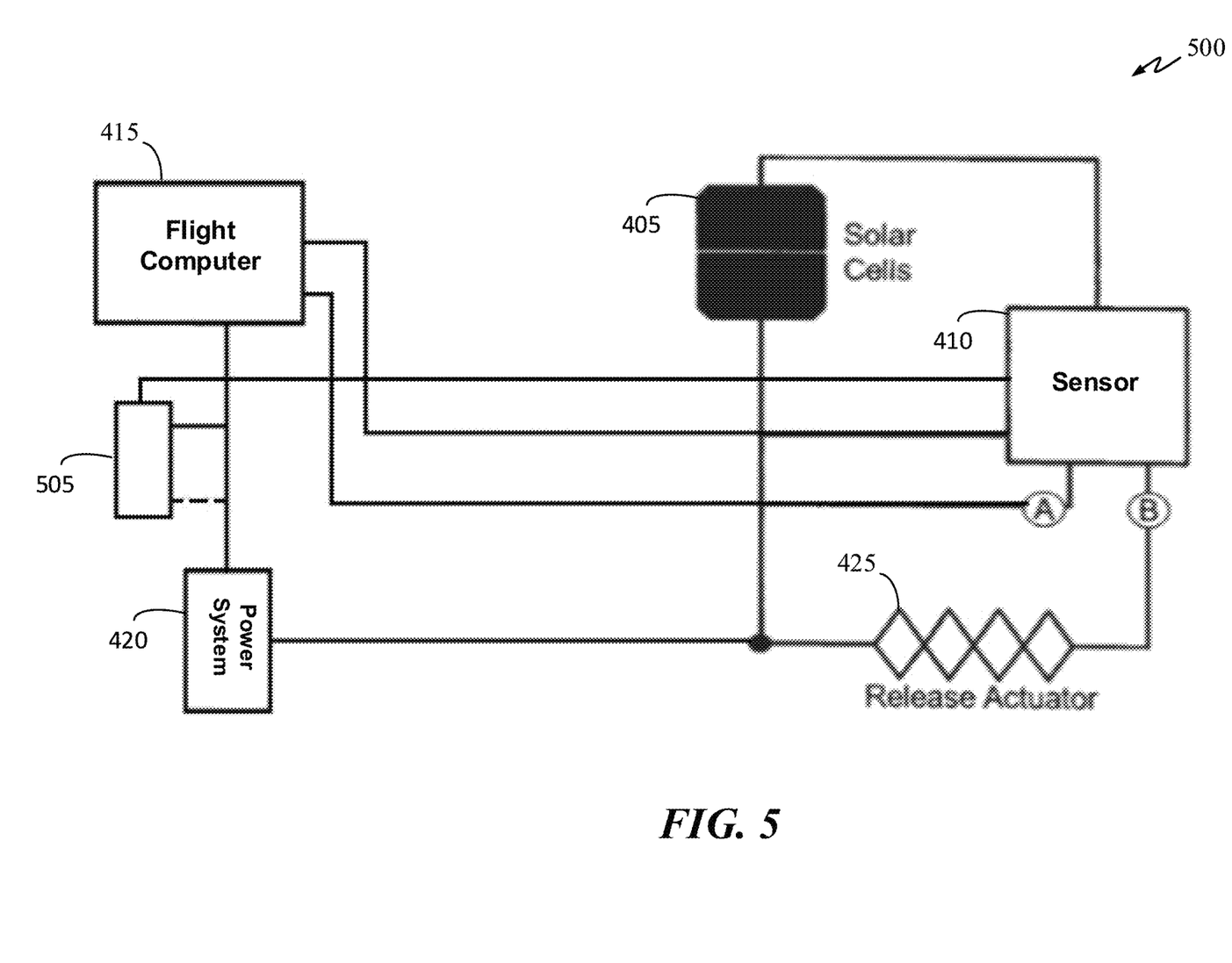

FIG. 5 is a circuit diagram of system 500 for deploying a deorbiting drag device in accordance with some embodiments of the present disclosure. System 500 is similar to system 400. System 500 includes photovoltaic panel 405, health sensor 410, release actuator 425, flight computer 415, power system 420, and a sensing circuit 505, which can be a voltage-sensing circuit, a current-sensing circuit, or a combination of both.

In system 500, power system 420 can be the main power source for flight computer 415. In some embodiments, sensing circuit 505 can monitor the health and status of power system 420 by measuring the voltage across the positive and negative nodes of the battery of power system 420. Alternatively, the voltage of the battery of power system 420 can be measured across the positive node and a ground. If no voltage is detected for a predetermined amount of time, the power source for flight computer 415 can be switched to the secondary power source, which can be photovoltaic panel 405.

In some embodiments, sensing circuit 505 can also monitor the health of power system 420 by measuring the current draw by flight computer 415 from power system 420. If no current draw is detected for a predetermined amount of time, the power source for flight computer 415 can be switched to photovoltaic panel 405. This can be done using one or more switches integrated within sensing circuit 505, power system 420, and health sensor 410. In some embodiments, both the power usage and the health signal (e.g., intermittent "I am alive" pulse") of the CPU are monitored to determine the health status of the CPU. For example, if the current draw of the CPU greatly exceeds the historical average current draw, a health status may be requested. If the CPU does not response, power can be diverted to the release actuator.

In system 500, health sensor 410 can monitor both the health status of both power system 420 and photovoltaic panel 405. In some embodiments, when sensing circuit 505 and/or health sensor 505 indicate that both power system 420 and photovoltaic panel 405 have failed, health sensor 410 can cause a power backup capacitor (not shown) to discharge power to release actuator 425.

As previously mentioned, health sensor 410 can ping flight computer 415 to check its status. If there is no response from flight computer 415 for a predetermined amount of time, health sensor 410 can automatically switch the power source of flight computer 415 from power system 420 to photovoltaic panel 405. After the power source is switched, health sensor 410 can ping flight computer 415 again to determine whether or not it is operational. In this embodiment, sensing 505 can be optional.

Figure 6:
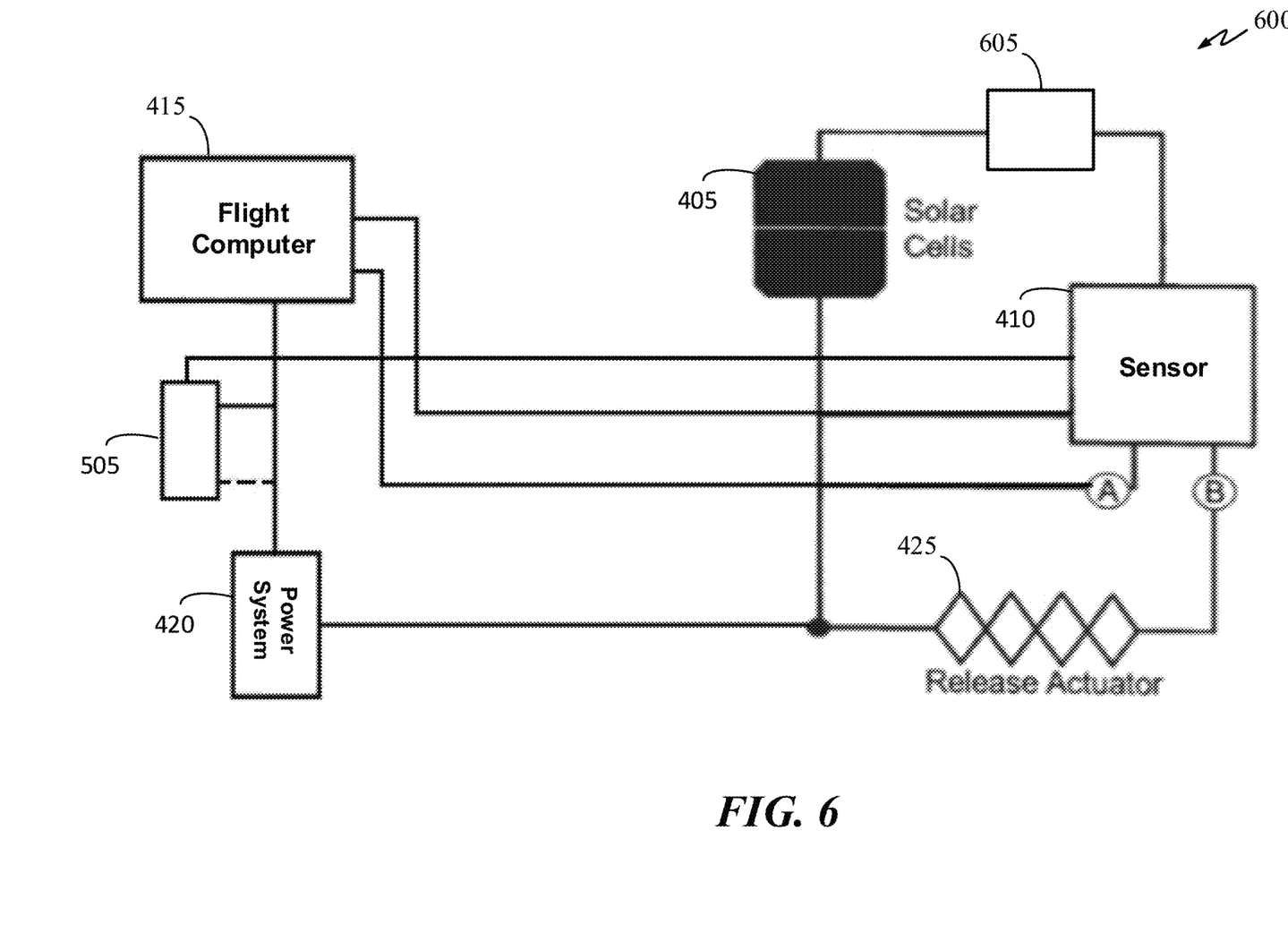

FIG. 6 is a circuit diagram of system 600 for deploying a deorbiting drag device in accordance with some embodiments of the present disclosure. System 600 is similar to systems 400 and 500, and may include one or more components as previously described in systems 400 and 500. As shown, system 600 includes photovoltaic panel 405, health sensor 410, release actuator 425, flight computer 415, power system 420, a sensing circuit 505, and a backup power circuit 605. Backup power circuit 605 can be coupled between photovoltaic panel 405 and health sensor 410.

In some embodiments, backup power circuit 605 can include a capacitor (not shown) with sufficient capacitance to actuate release actuator 425 in the event of complete power failure of power system 420 and photovoltaic panel 405. Backup power circuit 605 can be designed to only discharge when both power system 420 and photovoltaic panel 405 have failed. In this way, release actuator 425 can be actuated to release the deorbiting drag device even when there is no power from the main or secondary power source.

Figure 7:
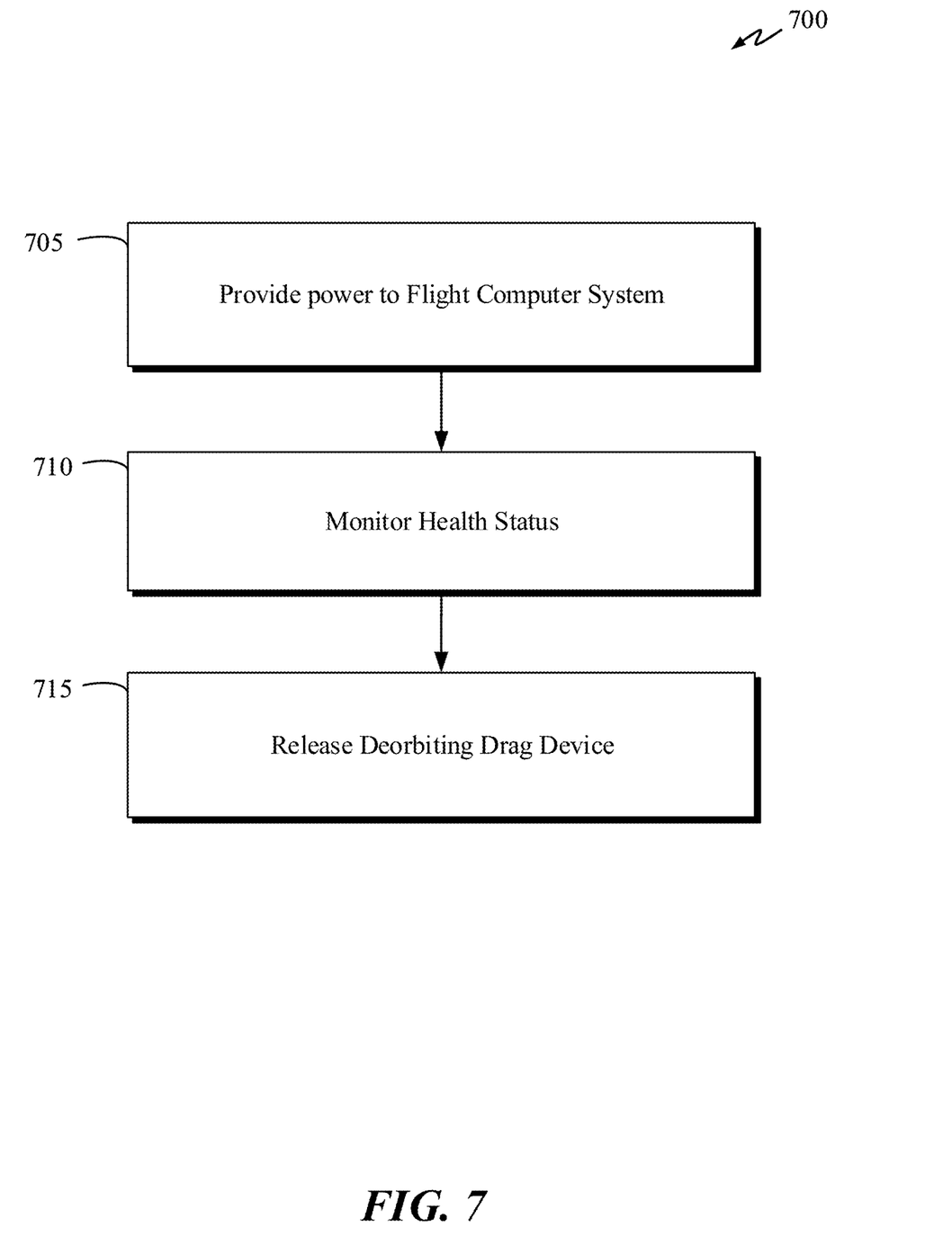
FIG. 7 is a process flow diagram of a method for deploying a deorbiting drag device in accordance with an aspect of the disclosure.

FIG. 7 illustrates a process 700 for deploying a deorbiting drag device in accordance with some embodiments of the present disclosure. Process 700 starts at 705 where power is provided to flight computer 415. Power can be provided to flight computer 415 using a main internal power source such as power system 420. In this embodiment, photovoltaic panel 405 can serve as a secondary power source, and can also recharge the batteries of power system 420. If the main power source (e.g., power system 420) fails at any time, photovoltaic panel 405 can be switched to be the main power source.

At 710, the health status of flight computer 415 is monitored using health sensor 410. At 715, if the health status of flight computer 415 indicates that it is no longer operational, release actuator 425 can be powered to release the deorbiting drag device. Under normal operating conditions, release actuator has no access to power. Only when flight computer 415 is no longer operational is power being diverted to release actuator 425.

The health of flight computer 415 can be monitored using a pulse sensor, which can be integrated into health sensor 410. In some embodiments, flight computer 415 is programmed to send a pulse (an "I am alive") signal on an intermittent basis to health sensor 410. If this intermittent signal is not received for a prolong period of time, then health sensor 410 can divert power to release actuator 425.

In some embodiments, the health status of the internal battery and the photovoltaic panel can also be monitored by one or more health sensors (e.g., health sensor 410). For example, flight computer 415 can lose power and become non-operational due to a failure at power system 420. Thus, prior to activating release actuator 425 to deploy the deorbiting drag device, the health status of power system 420 can be checked. This can be done by monitoring the voltage level of the battery of power system 420 or by monitoring the current draw from power system 420. If the voltage level or the current draw is zero, then flight computer can still be operational once its power source is switched to photovoltaic panel 405. In some embodiments, the health status of photovoltaic panel is also monitored. In some embodiments, release actuator 425 is activated only when both power system 420 and photovoltaic panel 405 have failed. In this embodiment, a backup power system (e.g., capacitor, battery) can be provided to power release actuator 425 in the event of failures in both power system 420 and photovoltaic panel 405.

In some embodiments, health sensor 410 can intermittently ping flight computer 415 for a status request. If flight computer 415 does not respond to the status request (ping) for a predetermined amount of time, then health sensor 410 (using a switch) can divert power to release actuator 425 to start the release of the deorbiting drag device.

Figure 8:
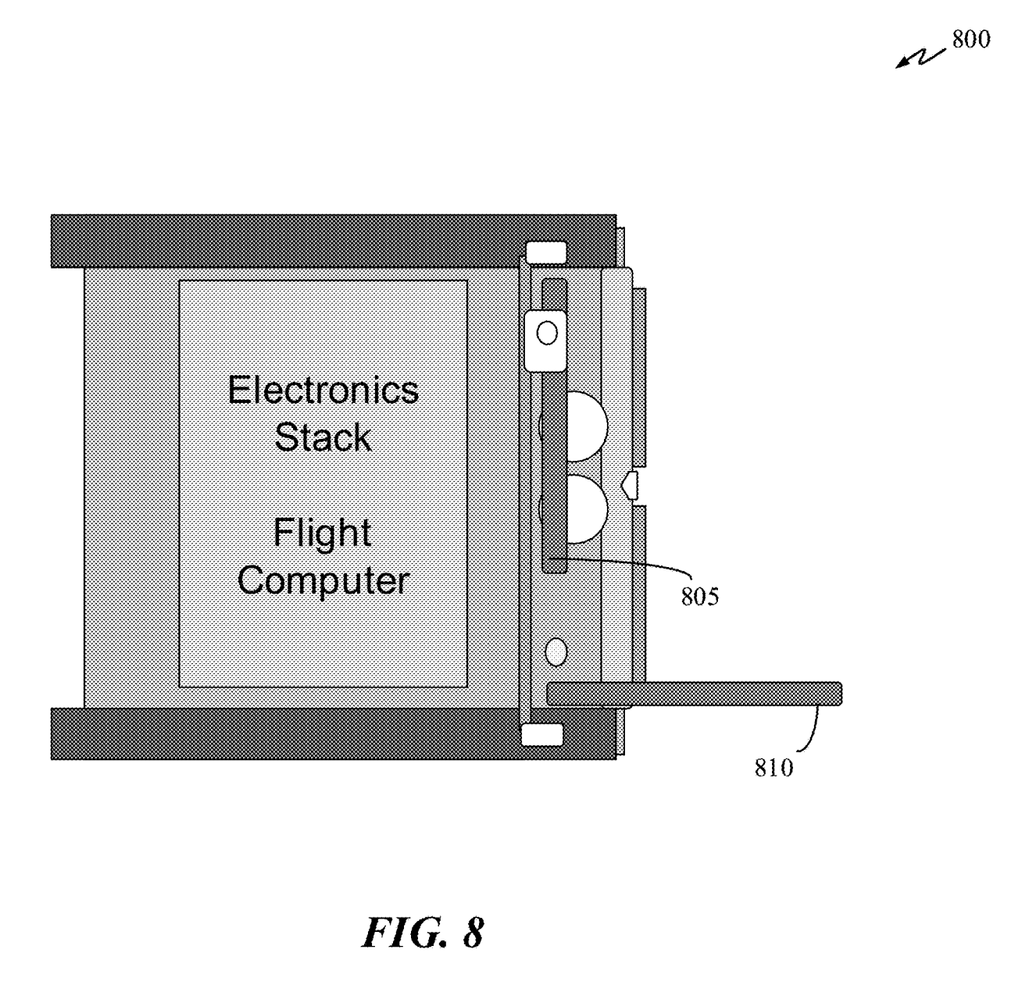
FIG. 8 illustrates an example of a CubeSat with deployed torque rods in accordance with some aspects of the disclosure.

Referring to FIG. 8, which illustrates CubeSat 800 with a plurality of torque rods 805 and 810. CubeSat 800 can have two or more torque rods. In some embodiment, CubeSat 800 can have three torque rods. CubeSat 800 may be similar to CubeSat 100 and may include one or more features of CubeSat 100 as described above. CubeSat 800 can include a flight computer and electronic stacks with a power system and sensor similar or identical to the power system and sensor in system 400, 500, or 600. In some embodiments, CubeSat 800 can use passive and/or active deorbiting systems to lessen the orbit lifespan of CubeSat 800. As shown, CubeSat 800 can include torque rods 805 and 810, which can be deployed by once the flight computer and/or the main power system is no longer operational. Torque rods 805 and 810 are orientation devices that are used to reorient CubeSat 800 in a certain direction. Once one of the torque rods is deployed, it reacts with the Earth's magnetic field to generate a force.

In some embodiments, CubeSat 800 can include a torque rod control module (not shown) configured to control the current flowing through each of the plurality of torque rods. The torque rod control module can vary the current of each torque rod to manipulate electrodynamic drag on each torque rod. In this way, the proper orientation (e.g., pointing toward the Earth), of CubeSat 800 can be achieved. Once the proper alignment is achieved, an active deorbiting system can be activated. In some embodiments, an active deorbiting system such as an electrospray or plasma thruster (not shown) can be activated once CubeSat 800 is in the proper orientation.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof.

Where a discrete value or range of values is set forth, it is noted that that value or range of values may be claimed more broadly than as a discrete number or range of numbers, unless indicated otherwise. For example, each value or range of values provided herein may be claimed as an approximation and this paragraph serves as antecedent basis and written support for the introduction of claims, at any time, that recite each such value or range of values as "approximately" that value, "approximately" that range of values, "about" that value, and/or "about" that range of values. Conversely, if a value or range of values is stated as an approximation or generalization, e.g., approximately X or about X, then that value or range of values can be claimed discretely without using such a broadening term. Those of skill in the art will readily understand the scope of those terms of approximation. Alternatively, each value set forth herein may be claimed as that value plus or minus 5%, and each lower limit of a range of values provided herein may be claimed as the lower limit of that range minus 5%, and each upper limit of a range of values provided herein may be claimed as the upper limit of that range plus 5%, and this paragraph serves as antecedent basis and written support for the introduction of claims, at any time, that recite those percentile variations.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In many instances entities are described herein as being coupled to other entities. It should be understood that the terms "coupled" and "connected" (or any of their forms) are used interchangeably herein and, in both cases, are generic to the direct coupling of two entities (without any non-negligible intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

Additionally, as used herein and in the appended claims, the singular forms "a," "an," and "the" include plural referents unless the context clearly dictates otherwise.

The invention claimed is:

1. A system for deploying a deorbiting drag device on a satellite, the system comprising:

a flight computer;
a drag device;
a health sensor, coupled to the flight computer, the health sensor configured to monitor a health status of the satellite by pinging the flight computer, the health sensor comprising a switch;
a release actuator configured to retain the drag device in an undeployed position; and
a photovoltaic panel coupled to a satellite-power inlet, the health sensor, and to the release actuator, wherein the health sensor is configured to switch, using the switch, power generated by the photovoltaic panel from the satellite-power inlet to the release actuator based on the health status of the satellite, the health status of the satellite determined based on a lack of a response to the pinging of the flight computer, and wherein the release actuator is configured to release the deorbiting drag device upon receiving a current from the photovoltaic panel.

2. The system of claim 1, wherein the health sensor comprises a pulse sensor configured to receive intermittent signals from a central processing unit of the satellite, wherein the release actuator is configured to release the deorbiting drag device when no intermittent signal is received by the pulse sensor for a predetermined amount of time.

3. The system of claim 1, wherein the health sensor comprises a current-sensing circuit coupled between a central processing unit of the satellite and the photovoltaic panel, wherein the release actuator is configured to release the deorbiting drag device when a current draw is not detected for a predetermined amount of time.

4. The system of claim 1, wherein the photovoltaic panel is a main power source of the satellite.

5. The system of claim 1, further comprises a main internal power source and wherein the photovoltaic panel is a secondary power source of the satellite.

6. The system of claim 5, wherein the health sensor comprises a current-sensing circuit configured to sense intermittent power draws from the main internal power source of the satellite, wherein the release actuator is configured to release the deorbiting drag device when intermittent power draws is not detected by the current-sensing circuit.

7. The system of claim 5, wherein the health sensor comprises one or more voltage-sensing circuits configured to sense voltage across the main internal power source of the satellite and the photovoltaic panel, wherein the release actuator is configured to release the deorbiting drag device when a voltage is not detected from the main internal power source and the photovoltaic panel.

8. The system of claim 7, further comprises a capacitor electrically coupled to the release actuator, wherein the capacitor is configured to discharge when there is a failure of both the main internal power source and the photovoltaic panel.

9. The system of claim 1, wherein the deorbiting drag device comprises a device selected from a group of consisting of a sail, an electrodynamic tether, a drag chute, and a balloon.

10. The system of claim 1, wherein the release actuator comprises a shape memory alloy wire configured to cause the deorbiting drag device to release upon receiving a current from the photovoltaic panel.

11. The system of claim 1, wherein the release actuator comprises a burn wire configured to melt upon receiving a current from the photovoltaic panel.

12. A method for deploying a deorbiting drag device on a satellite, the system comprising:
   providing power, using a photovoltaic panel, to a central processing unit (CPU) of the satellite;
   determining, using a health sensor, a health status of the satellite by monitoring activities of the CPU based on a lack of a response to a pinging of the CPU; and
   releasing a deorbiting device based on the health status by diverting power from the photovoltaic panel to a release actuator.

13. The method of claim 12, wherein the deorbiting device comprises a passive drag device selected from a group of consisting of a sail, an electrodynamic tether, and a balloon.

14. The method of claim 12, wherein the deorbiting device comprises an active device selected from a group ef consisting of an electrospray and plasma thruster.

15. The method of claim 12, wherein determining the health status comprises monitoring, using a pulse sensor, intermittent signals from the CPU, and wherein power is diverted to the release actuator when no intermittent signal is detected for a predetermined amount of time.

16. The method of claim 12, wherein determining the health status comprises monitoring, using a current-sensing circuit, power usage of the CPU, and wherein power is diverted to the release actuator when no power usage is detected for a predetermined amount of time.

17. The method of claim 12, further comprises providing an internal power source to the CPU, wherein power from the photovoltaic panel is a secondary power source and the internal power source is a main power source.

18. The method of claim 16, wherein determining the health status comprises monitoring, using a current-sensing circuit, intermittent power usage of the internal power source, and wherein power is diverted to the release actuator when no power usage is detected for a predetermined amount of time.

19. The method of claim 16, wherein determining the health status comprises monitoring, using a voltage-sensing circuit, voltages from the internal power source and the photovoltaic panel, and wherein power is diverted to the release actuator when no voltage is detected from both the internal power source and the photovoltaic panel.

20. The method of claim 12, wherein the release actuator comprises a shape memory alloy wire configured to release the drag device upon receiving a current from the photovoltaic panel.

* * * * *